US006679761B1

United States Patent
Sunahara et al.

(10) Patent No.: US 6,679,761 B1
(45) Date of Patent: Jan. 20, 2004

(54) POLISHING COMPOUND FOR SEMICONDUCTOR CONTAINING PEPTIDE

(75) Inventors: Kazuo Sunahara, Kanagawa (JP); Katsuyuki Tsugita, Kanagawa (JP); Sachie Shinmaru, Kanagawa (JP)

(73) Assignee: Seimi Chemical Co., Ltd., Chigasaki (JP)

(*) Notice: Subject to any disclaimer, the term of this patent is extended or adjusted under 35 U.S.C. 154(b) by 0 days.

(21) Appl. No.: 10/111,410

(22) PCT Filed: Nov. 2, 2000

(86) PCT No.: PCT/JP00/07725
§ 371 (c)(1),
(2), (4) Date: May 6, 2002

(87) PCT Pub. No.: WO01/33620
PCT Pub. Date: May 10, 2001

(30) Foreign Application Priority Data

Nov. 4, 1999 (JP) .......................................... 11-313553

(51) Int. Cl.$^7$ ................................................ B24B 1/00
(52) U.S. Cl. ............................ 451/41; 451/60; 451/63; 51/301; 438/691
(58) Field of Search .............................. 451/41, 60, 63; 51/301; 438/691, 692, 693

(56) References Cited

U.S. PATENT DOCUMENTS

| 6,428,392 B1 | 8/2002 | Sunahara et al. |
| 2002/0098697 A1 * | 7/2002 | Shimazu et al. ............ 438/691 |

FOREIGN PATENT DOCUMENTS

| JP | 2000-133621 | 5/2000 |
| JP | 2001-7060 | 1/2001 |
| JP | 2001-23940 | 1/2001 |

OTHER PUBLICATIONS

English Language abstract for JP 2000–133621.*

* cited by examiner

Primary Examiner—M. Rachuba
(74) Attorney, Agent, or Firm—Oblon, Spivak, McClelland, Maier & Neustadt, P.C.

(57) ABSTRACT

A polishing compound and a polishing method are provided, whereby in a CMP process in a process for production of a semiconductor device, a metal layer and/or a barrier layer, etc., can be polished while suppressing excessive oxidation of the metal layer, and the polishing rate can be adjusted depending upon the application. A polishing compound comprising polishing abrasive grains and a peptide, a polishing compound slurry having such a polishing compound suspended in an aqueous medium, preferably together with an oxidizing agent and preferably at a pH of at least 7, and a method for polishing a metal layer of e.g. Cu and/or a barrier layer, formed on a semiconductor substrate, by polishing with an abrasive cloth of a CMP apparatus having such a polishing compound slurry supported thereon, are disclosed.

21 Claims, 7 Drawing Sheets

POLISHING COMPOUND FOR SEMICONDUCTOR CONTAINING PEPTIDE

TECHNICAL FIELD

The present invention relates to a polishing compound to be used for chemical mechanical polishing in a process for production of semiconductor integrated circuits and further relates to a polishing method for a metal layer and/or a barrier layer formed on a semiconductor substrate, employing such a polishing compound.

BACKGROUND ART

At present, in order to meet the demands for further microsizing, higher performances, higher speed and lower power consumption of various digital household equipments, mobile computers, portable information/communication devices, etc., studies for microsizing and high densification are continued also with respect to semiconductor integrated circuits (hereinafter referred to simply as semiconductor apparatus or semiconductor devices) to be used as incorporated as key components of such instruments. For this purpose, a highly densified multilayer interconnection structure is being seeked wherein a wiring pattern with a fine line width of submicron design rule is embedded on an insulating layer formed on a substrate, and such fine wiring structures are multi-layered with an insulating layer interposed.

As microsizing and high densification of semiconductor devices advance by such multilayer interconnection structures, irregularities of the surface of each layer will increase, and steps of such irregularities tend to exceed the focal depth of a lithography optical system. Such irregularities bring about various problems such that they will cause disconnection or short circuit in the multilayer interconnection process. Accordingly, it is essential to carry out planarization of the semiconductor substrate surface at an appropriate stage of the production process.

Accordingly, as an important key technology for planarization treatment, attention has been drawn to chemical mechanical polishing (hereinafter sometimes referred to as CMP), which is a polishing technique whereby an insulating film and/or a metal film formed on each layer (on the semiconductor substrate) can be ultraprecisely flattened.

Heretofore, as a wiring material for a semiconductor, a wiring material of aluminum (Al) type is used in many cases, since patterning can be carried out easily by e.g. dry etching. However, in the case of Al type, under a design rule for a wiring line width of at most 0.25 μm, insulation resistance between elements tends to be not negligible, whereby a substantial wiring delay time will result. In addition, there is a problem such that a power loss due to charge and discharge caused by parasitic capacity among Al type wirings, will be a serious hindrance against reduction of power consumption of mobile instruments, etc.

Therefore, there has been an attempt to use copper (Cu) wiring and Cu alloy wiring (hereinafter sometimes referred to simply as Cu or the like) which are materials having lower resistance, as the material for multilayer interconnection for semiconductor devices of future generation. With Cu or the like, the dry etching temperature is required to be higher, and patterning of a thin film by dry etching can not so easily be carried out as in the case of Al. Therefore, usually, Cu or the like is embedded in wiring grooves and/or via holes (contact grooves) on interlaminar insulating layers by e.g. electrolytic plating, followed by CMP polishing for planarization to remove excess Cu or the like. This is a technique so-called Damascine method proposed by IBM, and thus, the CMP technique for metal such as Cu (so-called metal CMP) will be the main technique for semiconductor devices in future.

A general principle of metal CMP is considered to be as follows. Namely, an oxidizing agent in the polishing compound oxidizes the metal surface to form a thin film of a metal oxide on the surface. This metal oxide is usually in a passive state, and on the passivated surface, no further reaction proceeds. The thin film of such a metal oxide is usually brittle than the thin film of the metal itself, and thus, the portion in contact with the polishing pad can easily be mechanically removed by polishing abrasive grains, whereby the metal surface will again be exposed. It is explained that such an exposed surface is again oxidized, and such a process is repeated, whereby polishing of the metal film becomes possible.

However, according to a study carried out by the present inventors, among metals, in the case of Cu or the like, it is not so easy to apply CMP as compared with e.g. tungsten. One of the reasons is that the mechanism for forming the thin film of copper oxide is not clearly understood. To apply CMP, it is basically necessary to form a coating film of copper oxide on the surface of metallic copper. However, by a conventional polishing compound, it has been often difficult to form a coating film of copper oxide having a proper thickness or the minimum thickness required. If a thin film of copper oxide is formed in a thickness more than necessary, such a thick copper oxide film will not be so brittle, can not easily be removed by polishing abrasive grains, but will rather hinder such polishing, whereby there will be a problem that the polishing rate substantially decreases.

Thus, it is required to provide a polishing compound suitable for microsizing of semiconductor devices, which used to be difficult by a conventional polishing compound, particularly a polishing compound which is capable of polishing a metal layer of Cu or the like at a sufficient polishing rate and which is excellent in global planarization of the surface of a semiconductor substrate.

The object of the present invention is to provide a polishing compound having an adequate polishing rate for metal CMP in the process for production of a semiconductor device, particularly to provide a polishing compound capable of accomplishing an adequate polishing rate at the time of polishing a metal layer of Cu or the like.

DISCLOSURE OF THE INVENTION (1) The present invention provides a polishing compound for polishing a metal layer and/or a barrier layer formed on a semiconductor substrate, which is a polishing compound for chemical mechanical polishing in a process for production of a semiconductor device and which comprises polishing abrasive grains and a peptide.

(2) Further, the present invention provides a method for polishing a semiconductor substrate, characterized in that with the above polishing compound supported on a polishing cloth of a chemical mechanical polishing apparatus, i.e. specifically, while supplying a slurry of the above polishing compound to an abrasive cloth of a chemical mechanical polishing apparatus, at least a part of a metal layer and/or a barrier layer of a semiconductor substrate is polished.

PRACTICAL EMBODIMENTS FOR CARRYING OUT THE INVENTION

Figure 1:
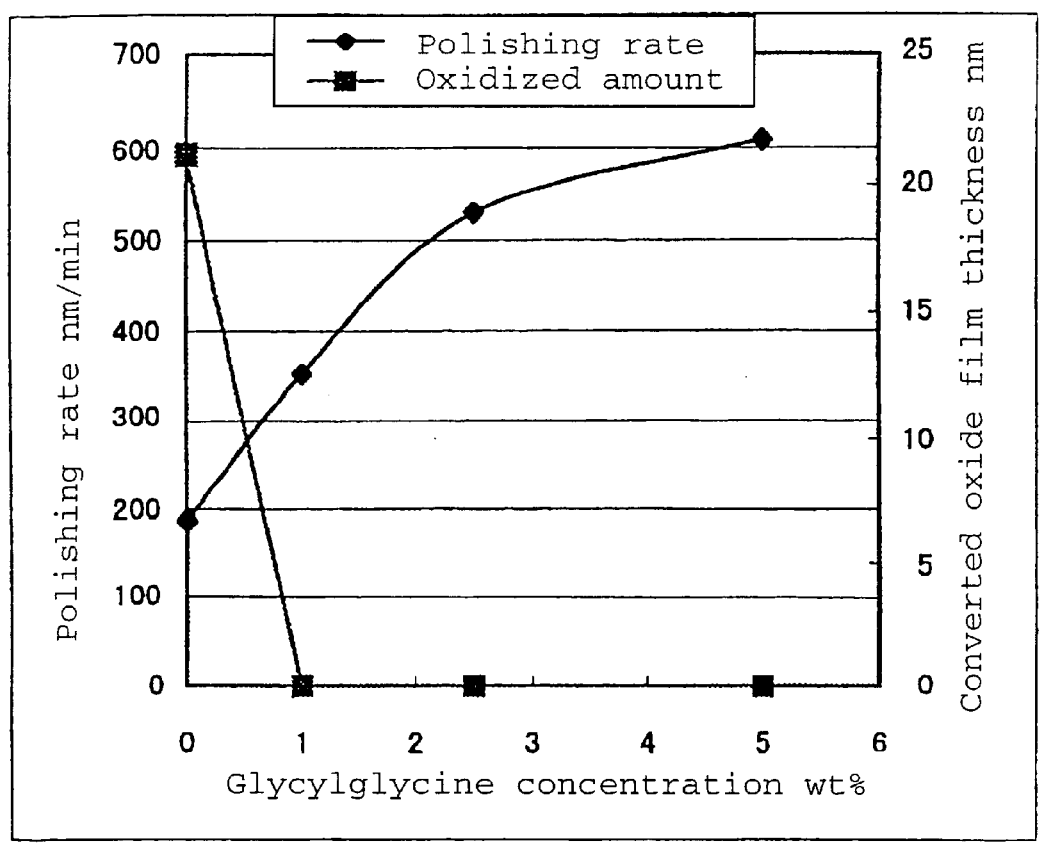
FIG. 1 is a graph of the polishing rate and the converted oxide thickness in the case of a polishing slurry of Example 1.

Still other practical embodiments of the present invention will be apparent from the following description.

As the polishing abrasive grains in the polishing compound of the present invention, polishing abrasive grains for chemical mechanical polishing which are commonly used for polishing metal layers formed on semiconductor substrates, are used.

The polishing abrasive grains may, for example, be cerium oxide ($CeO_2$), alumina (aluminum oxide: $Al_2O_3$), silicon dioxide ($SiO_2$), zirconium oxide ($ZrO_2$), titanium oxide ($TiO_2$), germanium oxide (GeO, $GeO_2$) or silicon nitride ($Si_3N_4$). Among them, cerium oxide or alumina is preferred, since the effects become high when the after-mentioned peptide is incorporated. Especially, cerium oxide is very effective abrasive grains basically for $SiO_2$. Therefore, $SiO_2$ which appears near the end point of polishing of a copper wiring as a metal layer, can readily be polished, and it is particularly effective as polishing abrasive grains for polishing a surface where a metallic layer and/or a barrier layer and a $SiO_2$ layer (an insulating film) are present in a mixed state.

Further, in the present invention, it is preferred to use cerium oxide and alumina simultaneously as polishing abrasive grains to optimize the ratio of the polishing rates against the metal layer, the barrier layer and the insulating film ($SiO_2$) layer, respectively, at the time of polishing the surface of a semiconductor substrate having the metal layer, the barrier layer and the insulating film ($SiO_2$) layer. In such a case, by suitably changing the ratio of cerium oxide and alumina, it is possible to control the above ratio of the polishing rates.

Further, it is possible to use polishing abrasive grains made of cerium oxide or alumina as the main component and to incorporate the above-mentioned other polishing abrasive grains thereto. In such a case, the amount of such other polishing abrasive grains to be incorporated is preferably at most 30 wt %, preferably at most 15 wt %, based on the total weight of cerium oxide and/or alumina.

The weight average particle size of such abrasive grains is not particularly limited, but is usually from 0.01 to 0.5 μm, preferably from 0.1 to 0.3 μm, with a view to maintaining the polishing rate of the metal layer and/or the barrier layer and preventing formation of scratches.

Further, in the present invention, for the weight average particle size, the particle size distribution is obtained based on mass, and an accumulative curve is drawn for the total mass of 100%, and the weight average particle size is a particle size at a point where the accumulative curve shows 50%. This is referred to also as a mass base accumulative 50% diameter (e.g. Chemical Engineering Handbook "Fifth Edition" (compiled by Chemical Engineering Association), p 220–221). The measurement of the particle sizes, is carried out by thorough dispersion in a medium such as water by means of e.g. ultrasonic treatment, followed by the measurement of the particle size distribution.

The polishing compound of the present invention is used preferably in the form of a slurry (hereinafter referred to also as a polishing compound slurry) having from 0.1 to 30 wt %, preferably from 1 to 15 wt %, of polishing abrasive grains dispersed therein, obtained by thoroughly dispersing the polishing abrasive grains in water or a water-type medium (in this specification, generally referred to as "an aqueous medium") by e.g. a homogenizer or a ball mill. Here, the water-type medium is a solvent mixture containing water as the main component and having at most 20 wt %, preferably at most 10 wt %, of an organic solvent which is water-soluble or miscible with water, such as methanol, ethanol or isopropanol, added thereto.

The oxide abrasive grains of e.g. cerium oxide, as polishing abrasive grains to be used in the present invention, are available as commercial products but may readily be obtained by firing a raw material such as a rare earth carbonate in an electric furnace. By adjusting the particle size, etc. of the raw material by e.g. pulverization, it is possible to adjust the particle size of the abrasive grain within a desired range. Further, after firing, classification, etc., may be applied to select those having preferred particle sizes. For the classification operation, dry classification is possible, but wet classification is preferred whereby classification can be carried out with higher accuracy.

The polishing compound of the present invention is characterized in that it contains at least a peptide together with the above-described polishing abrasive grains.

The peptide to be used in the present invention is not particularly limited, but it is usually one containing from 2 to 100 amino acid units, preferably one containing from 2 to 30 amino acid units, more preferably one having from 2 to 10 amino acid units (a so-called oligopeptide).

The amino acid units may, for example, be glycine (Gly), alanine (Ala), valine (Val), leucine (Leu), isoleucine (Ileu), serine (Ser), threonine (thr), tyrosine (Thre), cysteine (Cys), cystine (Cys.Cys), methionine (Met), asparaginic acid (Asp), glutamic acid (Glu), lysine (Lys), arginine (Arg), histidine (His), proline (Pro), hydroxyproline (Hpro), phenylalanine (Phe), tyrosine (Tyr) and tryptophane (Try).

Further, the peptide obtainable from such amino acid units may, for example, be glycidylglycine (which will be represented by Gly-Gly, and similar representation will be used hereinafter), alanyl-alanine (Ala-Ala), glycylalanine (Gly-Ala), alanylglycine (Ala-Gly), glutamyl-glutamic acid (Glu-Glu), glycidylglycylglycine (Gly-Gly-Gly), glycylalanylserine (Gly-Ala-Ser), glycylphenylalanine (Gly-Phe), alanylcysteinylglycine (Ala-Cys-Ser), glycylalanylvaline (Gly-Ala-Val), glutamylcysteinylglycine (Glu-Cys-Gly) (glutathione) or leucylglycylglycine (Leu-Gly-Gly).

Further, it may be an oligomer such as a dimer, a trimer, a tetramer, a pentamer, a hexamer ... thereof. In such a case, e.g. a pentamer of glycylalanine (Gly-Ala) will be represented by $(Gly-Ala)_5$, and a trimer of alanylglycine (Ala-Gly) will be represented by $(Ala-Gly)_3$.

These peptides can be obtained by using the above-mentioned amino acids as starting materials and condensing them by using proper protecting groups and condensing agents, or they may easily be obtained by hydrolyzing proteins. Further, commercially available products may be employed.

From the viewpoint of availability, preferred are glycidylglycine (Gly-Gly), alanyl-alanine (Ala-Ala), glycylalanine (Gly-Ala), alanylglycine (Ala-Gly), glycidylglycylglycine (Gly-Gly-Gly) and di- to hepta-mers thereof.

The content of the peptide in the polishing compound of the present invention is from 0.1 to 20 wt %, preferably from 0.5 to 10 wt %, more preferably from 1 to 7 wt %, in the case of a polishing compound slurry. If the content of the peptide is substantially smaller than this, no adequate effect for preventing excessive oxidation of the metal layer can be obtained. On the other hand, if it exceeds the above range, no further effects can be expected, and such will be a waste.

In a case where a metal layer of a semiconductor substrate is polished by CMP for a metal, in order to obtain an adequate polishing rate, it is necessary to carry out polishing while oxidizing the surface of the metal layer (i.e. while activating the surface by forming a thin oxide film on the surface), and it is preferred to incorporate an oxidizing agent to the polishing compound slurry. As such an oxidizing agent, known hydrogen peroxide, urea peroxide, peracetic acid, iron nitrate or an iodate may, for example, be used. Especially when Cu or the like is to be polished, hydrogen peroxide is preferred, since its oxidizing power is strong so that a thin metal oxide film can readily be formed on metal surface, whereby the polishing rate can be substantially improved.

However, when hydrogen peroxide having a strong oxidizing power is used as the oxidizing agent, it is likely that the metal layer is oxidized more than necessary, and a thick metal oxide layer tends to be formed on the surface, whereby, as mentioned above, polishing is rather hindered, thus leading to a phenomenon such that the polishing rate rather decreases. Especially when cerium oxide or alumina which by itself has an oxidizing power, is used as polishing abrasive grains, in combination with the oxidizing action by such abrasive grains, oxidation of the metal layer tends to take place excessively.

Under these circumstances, in the present invention, a peptide such as the above-mentioned glycidylglycine or glycylalanine, is incorporated to the polishing compound, whereby excessive oxidation of a metal such as Cu by hydrogen peroxide or cerium oxide abrasive grains or the like, can be prevented, and a high polishing rate against a metal layer can be maintained.

The polishing compound of the present invention is used as a polishing agent for a metal layer especially in the process for production of semiconductor devices. The polishing power of a polishing compound slurry changes depending upon its pH. Accordingly, it is common to select a proper pH by means of a pH controlling agent, taking into consideration the oxidizing power of the polishing compound or the type of the metal to be polished. In the polishing compound of the present invention, the pH is adjusted usually from 7 to 13.0, preferably 7 to 10.0, more preferably from 7.5 to 9.5, whereby a higher planarization ability can be obtained.

The pH controlling agent is not particularly limited so long as it is one showing basicity in an aqueous solution, and a known acid or alkali component may be employed. However, in view of polishing efficiency after CMP and a low price, ammonia or a basic alkali metal compound is preferred. Ammonia is particularly preferred from a viewpoint such that the pH control is thereby easy. The pH can be easily adjusted to the desired level by adding aqueous ammonia or the like or blowing ammonia gas, to a polishing compound slurry having polishing abrasive grains dispersed in water. Further, as the basic alkali metal compound, sodium hydroxide or potassium hydroxide may, for example, be mentioned, but from the viewpoint of washing efficiency, potassium hydroxide is particularly preferred.

Further, in some cases, it is useful to stabilize the pH by utilizing pH buffering effects by employing a plurality of acid and alkali components as pH controlling agents.

Further, ammonium ions will form a water-soluble copper ammonia complex (an anmin complex) with Cu. Accordingly, in some cases, in order to accelerate polishing of Cu, an ammonium compound such as ammonium carbonate or ammonium heavy carbonate, which will be a supply source of ammonium ions, may be added to the polishing compound slurry. Further, it may be a primary to tertiary amine or hydroxyl amine. Further, as proposed by the present inventors, in some cases, a quaternary ammonium salt such as tetramethylammonium hydroxide or tetraethylammonium hydroxide, may be used as the pH controlling agent.

According to a study by the present inventors, as shown in Examples given hereinafter, with a conventional polishing compound for a metal layer of Cu or the like, a metal layer was oxidized excessively by an oxidizing agent such as hydrogen peroxide, and an unnecessarily thick metal oxide layer of e.g. from 20 to 35 nm was formed on the surface, whereby the polishing rate was substantially deteriorated. Whereas, in the polishing compound of the present invention, a peptide is incorporated, whereby such excessive oxidation of the metal layer, particularly oxidation of Cu or the like, can be prevented, and only an oxide layer having the minimum thickness required to smoothly advance the polishing mechanism of the metal layer, can be formed. Accordingly, even in a system where a strong oxidizing agent such as hydrogen peroxide is incorporated, excessive oxidation can be prevented, and a high polishing rate against a metal layer can be maintained, such being particularly useful.

To prevent such excessive oxidation of a metal layer, a complex-forming agent such as an amino acid to form a complex, may also be used. However, with a peptide, such an effect is far superior to an amino acid or the like. This is believed to be attributable to the fact that in an oxidation-reduction potential range and pH range within which copper oxide is usually formed, the peptide becomes a multidentate ligand and thereby forms a copper/peptide complex which is far stable as compared with an amino acid.

Further, in the case of copper wiring, e.g. tantalum (Ta) may be employed as a barrier layer to prevent diffusion of Cu into the insulation film. Accordingly, in the polishing of copper wiring, it is required to polish copper and tantalum to be used as its barrier layer, simultaneously. In such a case, in order to obtain a high polishing rate against tantalum, a strongly basic condition for the polishing compound slurry by e.g. potassium hydroxide or a quaternary ammonium salt, is preferably employed. However, under such a condition, there is a problem that Cu or the like is more readily oxidized.

In the present invention, even under such a condition, excessive oxidation of copper can be prevented as mentioned above, since a peptide such as glycylglycine is incorporated in the polishing compound. Further, under a condition where Cu or the like and tantalum are simultaneously polished, if ammonia is present in the polishing compound slurry, copper is likely to form a water-soluble copper/ammonia complex, whereby polishing will be accelerated. Accordingly, in order not to let the polishing rate of copper become too high as compared with tantalum, it is preferred to use potassium hydroxide rather than ammonia, as the pH controlling agent.

To the polishing compound slurry in the present invention, a dispersant, a thickner, a fungicide, a defoaming agent, a surfactant, etc., may further suitably be added depending upon the particular purpose.

The polishing process for polishing a metal layer formed on a semiconductor substrate by means of the polishing compound slurry of the present invention, can be carried out by a conventional method. For example, using a CMP apparatus comprising an upper polishing head provided with a driving device to give rotation while holding the material to be polished such as a semiconductor substrate and an opposingly provided lower rotatable platen having a polishing pad (a polishing cloth) bonded thereto, the polishing compound of the present invention is supported on the polishing cloth, i.e. specifically, the polishing compound slurry of the present invention having the pH adjusted, is supplied to this polishing cloth, and the polishing cloth is contacted with the semiconductor substrate which is rotating at a speed of from 50 to 300 rpm, to carry out the planarization.

Thus, the metal layer formed on the semiconductor substrate, particularly preferably, at least a part of the metal layer of Cu or the like and/or the barrier layer of tantalum or the like, is polished, so that from a few tens nm to a few thousands nm of the metal layer is removed for planarization.

The metal layer as the object to be polished in the present invention, is not particularly limited, and it may, for example, be Cu or the like, and W, Al, Ti or an alloy thereof, and the barrier layer may, for example, preferably be Ti, W, Ta or an alloy of Ta with Al, Ti, Si, W, Mo, Zn or the like, or a nitride or oxynitride of Ta or Ti.

EXAMPLES

Now, Examples of the present invention will be described, but it should be understood that the technical scope of the present invention is by no means restricted thereto.

Polishing compound slurries were prepared as in Examples 1 to 7, and the polishing rates and the copper oxide thicknesses were measured. Examples 1, 2, 4, 5 and 7 are Examples of the present invention, and Examples 3 and 6 are Comparative Examples.

(I) Preparation of Polishing Compound Slurry

1̂ Commercially available high purity alumina ($Al_2O_3$) was classified to have a weight average particle size of 0.2 $\mu$m, to obtain alumina abrasive grains.

2̂ Commercially available high purity cerium carbonate was wet-pulverized, dried and fired at 700° C. to obtain cerium oxide. This product was classified to have a weight average particle size of 0.2 $\mu$m, to obtain cerium oxide abrasive grains.

Using the above respective abrasive grains, polishing compound slurries were prepared as follows.

Example 1

To deionized water, 3 wt % of alumina, glycylglycine (Gly-Gly) and 3 wt % of hydrogen peroxide, were added, and the pH was adjusted to 8 with ammonia. Four types of samples of polishing compound slurries were prepared, wherein the amount of glycylglycine was 0 wt %, 1 wt %, 2.5 wt % and 5 wt %, respectively.

Example 2

To deionized water, 3 wt % of alumina, pentamer of glycylalanine ($(Gly-Ala)_5$) and 3 wt % of hydrogen peroxide, were added, and the pH was adjusted to 8 with ammonia. Four types of samples of polishing compound slurries were prepared, wherein the amount of $(Gly-Ala)_5$ was 0 wt %, 1 wt %, 2.5 wt % and 5 wt %, respectively.

Example 3

To deionized water, 3 wt % of alumina, glycine and 3 wt % of hydrogen peroxide, were added, and the pH was adjusted to 8 with ammonia. Four types of samples of polishing compound slurries were prepared, wherein the amount of glycine was 0 wt %, 1 wt %, 2.5 wt % and 5 wt %, respectively.

Example 4

To deionized water, 3 wt % of alumina, glycylglycine and 0.5 wt % of hydrogen peroxide, were added, and the pH was adjusted to 13 with potassium hydroxide. Four types of samples of polishing compound slurries were prepared, wherein the amount of glycylglycine was 0 wt %, 1 wt %, 2.5 wt % and 5 wt %, respectively.

Example 5

To deionized water, 3 wt % of alumina, $(Gly-Ala)_5$ and 0.5 wt % of hydrogen peroxide, were added, and the pH was adjusted to 13 with potassium hydroxide. Four types of samples of polishing compound slurries were prepared, wherein the amount of $(Gly-Ala)_5$ was 0 wt %, 1 wt %, 2.5 wt % and 5 wt %, respectively.

Example 6

To deionized water, 3 wt % of alumina, glycine and 0.5 wt % of hydrogen peroxide, were added, and the pH was adjusted to 13 with potassium hydroxide. Four types of samples of polishing compound slurries were prepared, wherein the amount of glycine was 0 wt %, 1 wt %, 2.5 wt % and 5 wt %, respectively.

Example 7

To deionized water, 3 wt % of cerium oxide and glycylglycine were added. Three types of samples of polishing compound slurries were prepared, wherein the amount of glycine was 0 wt %, 0.1 wt % and 1 wt %, respectively.

Example 8

To deionized water, 1 wt % of glycylglycine was added, and cerium oxide and alumina were added so that the composition would be as shown in Table 2, to obtain a sample of a polishing compound slurry.

(II) Measurements of the Polishing Rates and Copper Oxide Thicknesses

With respect to the polishing compound slurries for the above Examples 1 to 7, a polishing test of a copper plate, a tantalum plate or a quartz glass plate was carried out under the following polishing conditions 1̂, and the polishing rates $\hat{2}$ and the copper oxide thicknesses $\hat{3}$ were measured under the following conditions.

The results of polishing copper with the polishing compound slurry of Example 1, and the converted oxide thickness of copper were shown in FIG. 1. Hereinafter, the results of using the polishing compound slurries of Examples 2 to 7 in the same manner, were shown in FIGS. 2 to 7, respectively. Further, in Table 1, the polishing rates and the converted oxide thicknesses are shown together with the polishing conditions. In the Table, $pH_0$ is the value before adjusting the pH, and pH is the value after adjusting the pH.

Further, with respect to the polishing compound slurry of Example 8, a polishing test for a copper plate, a tantalum plate or a quartz glass plate was carried out in the same manner for two minutes under the following polishing conditions $\hat{1}$, and $\hat{4}$ (measurement of Ta/Cu polishing rate ratio) and $\hat{5}$ (measurement of quartz glass/Cu polishing rate ratio) were carried out under the following conditions. The results are shown in Table 2.

$\hat{1}$ (Polishing Conditions)

Polishing machine: NF-300 (manufactured by Kabushiki Kaisha Nano Factor)

Object to be polished: Copper plate (manufactured by Nilaco Corporation)

: Tantalum plate (manufactured by Nilaco Corporation)

: Quartz glass plate

Polishing pressure: 200 g/cm$^2$

Polishing pad: IC1400 (Roder Company)

Rotational speed: Head 60 rpm, platen 60 rpm

Supply speed of polishing compound slurry: 30 ml/min $\hat{2}$ (Measurement of Polishing Rate)

The weight difference of the object to be polished between before and after the polishing was measured, and converted to a thickness of the object to be polished corresponding to the weight reduction from the area of the object to be polished and the density of the object to be polished, to obtain the polishing rate (nm/min).

$\hat{3}$ (Measurement of the Copper Oxide Thickness)

To each polishing compound slurry, 0.5 wt % of hydrofluoric acid was added, and a copper plate was immersed in the slurry for two minutes, and from the weight difference of the copper plate between before and after the immersion, the converted copper oxide thickness (nm) converted to the thickness of copper oxide, was calculated.

$\hat{4}$ (Measurement of Ta/Cu Polishing Rate Ratio)

The weight difference of the object to be treated between before and after polishing the tantalum plate and the weight difference of the object to be polished between before and after polishing the copper plate, were measured, and the Ta/Cu polishing rate ratio was obtained from (weight difference of the object to be polished between before and after polishing the tantalum plate/weight difference of the object to be polished between before and after polishing the copper plate).

$\hat{5}$ (Measurement of Quartz Glass/Cu Polishing Rate Ratio)

The weight difference of the object to be treated between before and after polishing the quartz glass plate and the weight difference of the object to be polished between before and after polishing the copper plate, were measured, and the quartz glass/Cu polishing rate ratio was obtained from (weight difference of the object to be polished between before and after polishing the quartz glass plate/weight difference of the object to be polished between before and after polishing the copper plate).

TABLE 1

| | | | | Change when the amount of the peptide was increased from 0 to 5 wt % ||
|---|---|---|---|---|---|
| Ex. | Type of abrasive grains | pH/pH$_0$ (pH controlling agent) | Peptide or amino acid | Polishing rate nm/min | Converted oxide thickness Nm |
| 1 | Al$_2$O$_3$ | 8/4 (ammonia) | Gly—Gly | 190→610 | 22→0 |
| 2 | Al$_2$O$_3$ | 8/4 (ammonia) | (Gly—Ala)$_5$ | 190→490 | 22→0 |
| 3 | Al$_2$O$_3$ | 8/4 (ammonia) | Glycine | 190→530 | 22→1 |
| 4 | Al$_2$O$_3$ | 13/4 (KOH) | Gly—Gly | 80→116 | 35→1 |
| 5 | Al$_2$O$_3$ | 13/4 (KOH) | (Gly—Ala)$_5$ | 80→100 | 35→0 |
| 6 | Al$_2$O$_3$ | 13/4 (KOH) | Glycine | 80→121 | 35→20 |
| 7 | CeO$_2$ | — | Gly—Gly | 23→5 | 43→0 |

TABLE 2

| Wt % of alumina | Wt % of cerium oxide | Ta/Cu polishing rate ratio | Quartz glass/Cu polishing rate ratio |
|---|---|---|---|
| 0 | 0 | 0.00 | 1.90 |
| 0 | 0.2 | 0.77 | 1.99 |
| 0 | 1.0 | 1.76 | 9.26 |
| 0 | 3.0 | 0.76 | 5.16 |
| 0 | 5.0 | 0.75 | 5.18 |
| 0.2 | 0 | 2.34 | 2.11 |
| 0.2 | 0.2 | 10.22 | 10.13 |
| 0.2 | 1.0 | 1.96 | 2.73 |
| 0.2 | 3.0 | 2.16 | 7.62 |
| 0.2 | 5.0 | 1.16 | 6.44 |
| 1.0 | 0 | 2.76 | 0.32 |
| 1.0 | 0.2 | 1.95 | 0.00 |
| 1.0 | 1.0 | 1.69 | 1.27 |
| 1.0 | 3.0 | 1.07 | 3.34 |
| 1.0 | 5.0 | 1.03 | 4.78 |
| 3.0 | 0 | 2.98 | 0.56 |
| 3.0 | 0.2 | 2.27 | 1.69 |
| 3.0 | 1.0 | 2.50 | 0.99 |
| 3.0 | 3.0 | 1.37 | 1.76 |
| 3.0 | 5.0 | 1.37 | 3.22 |
| 5.0 | 0 | 2.49 | 1.84 |
| 5.0 | 0.2 | 3.10 | 5.06 |
| 5.0 | 1.0 | 2.26 | 1.27 |
| 5.0 | 3.0 | 1.71 | 0.23 |
| 5.0 | 5.0 | 8.84 | 8.84 |

From FIGS. 1 to 7 and Tables 1 and 2, the following conclusion will be led.

Figure 2:
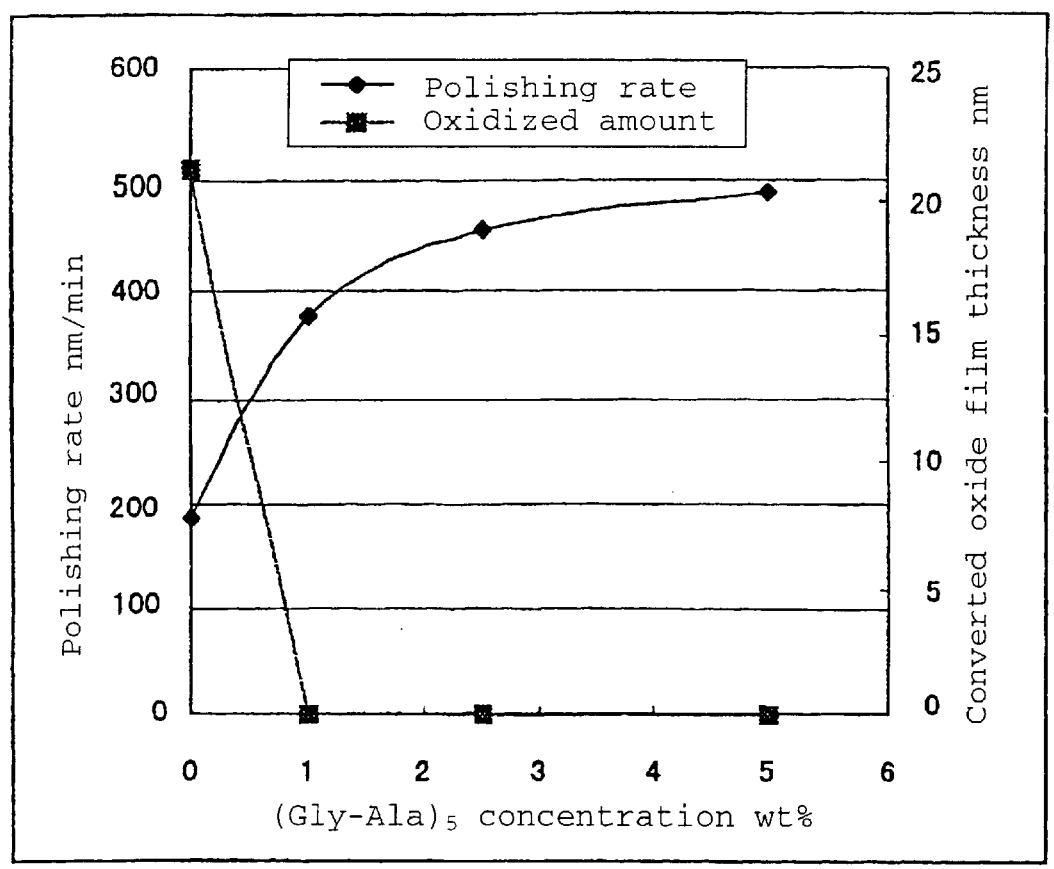
FIG. 2 is a graph of the polishing rate and the converted oxide thickness in the case of a polishing slurry of Example 2.
Figure 3:
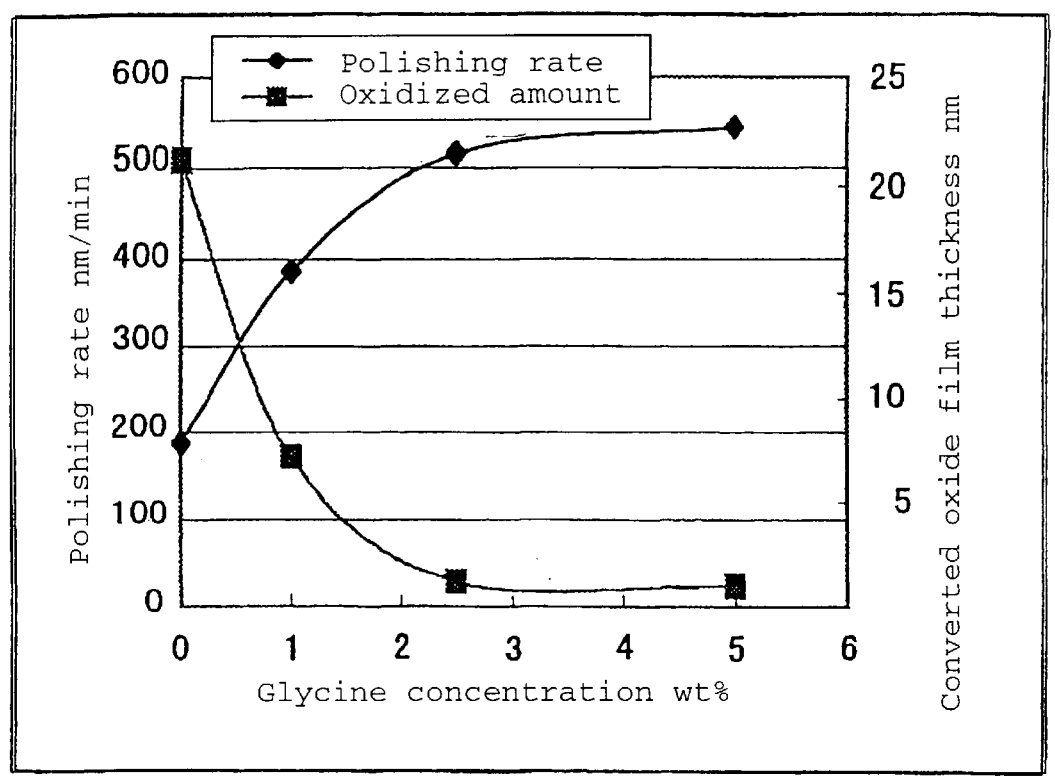
FIG. 3 is a graph of the polishing rate and the converted oxide thickness in the case of a polishing slurry of Example 3.

$\hat{1}$ With respect to Examples 1 to 3 (in cases wherein the polishing abrasive grains were alumina, hydrogen peroxide was added as an oxidizing agent, and the polishing compound slurries were adjusted to pH 8 with ammonia), as is evident from FIGS. 1 and 2 and Table 1, as the peptide concentration is increased from 1 to 5 wt %, the polishing rate increases from 190 to a level of from 500 to 600 (nm/min), while the converted copper oxide thickness decreases from 22 to 0 (nm), thus showing that film formation of copper oxide is completely prevented. Since the polishing rate substantially increases while the converted copper oxide thickness as measured by the above method becomes substantially 0, it is considered that on the copper surface, an extremely thin oxide film sufficient to maintain the mechanism of polishing, is always formed, and the surface is activated. Especially when ammonia is used as the pH controlling agent, the polishing rate can be improved to a large extent. Further, as shown in FIG. 3, when glycine as an amino acid was added instead of the peptide, the same effect as the peptide was observed, but even when glycine was added in an amount of 5 wt %, it was not possible to completely prevent formation of a copper oxide coating film.

Figure 4:
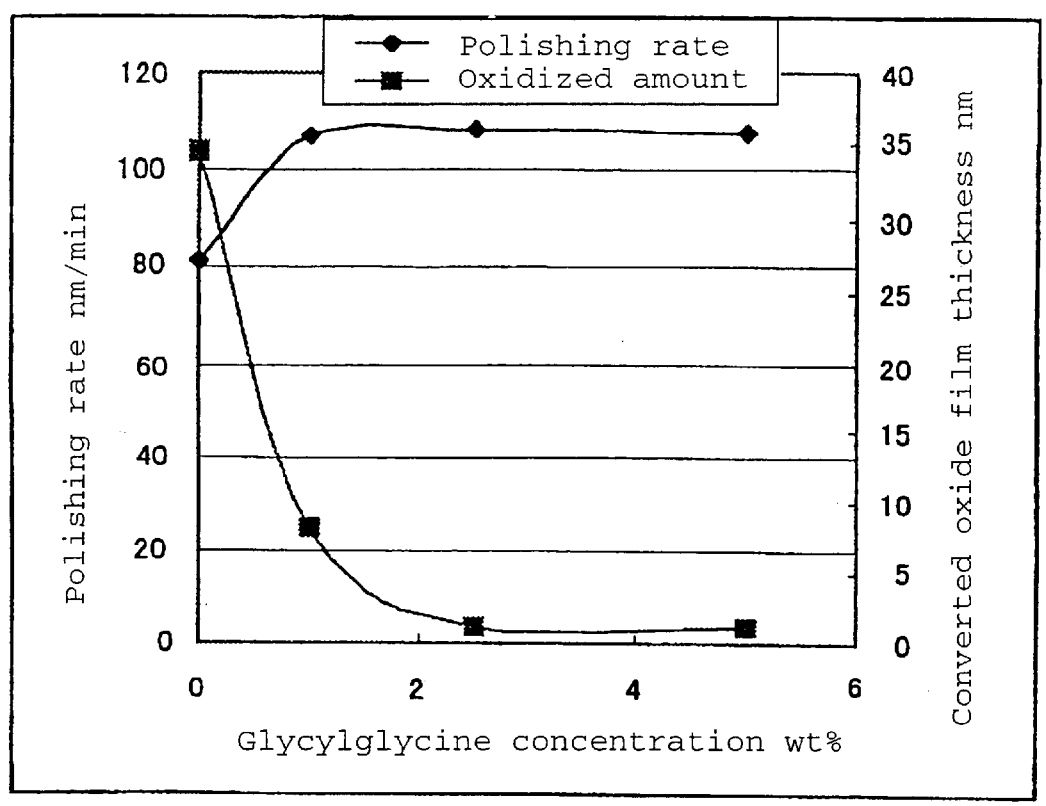
FIG. 4 is a graph of the polishing rate and the converted oxide thickness in the case of a polishing slurry of Example 4.
Figure 5:
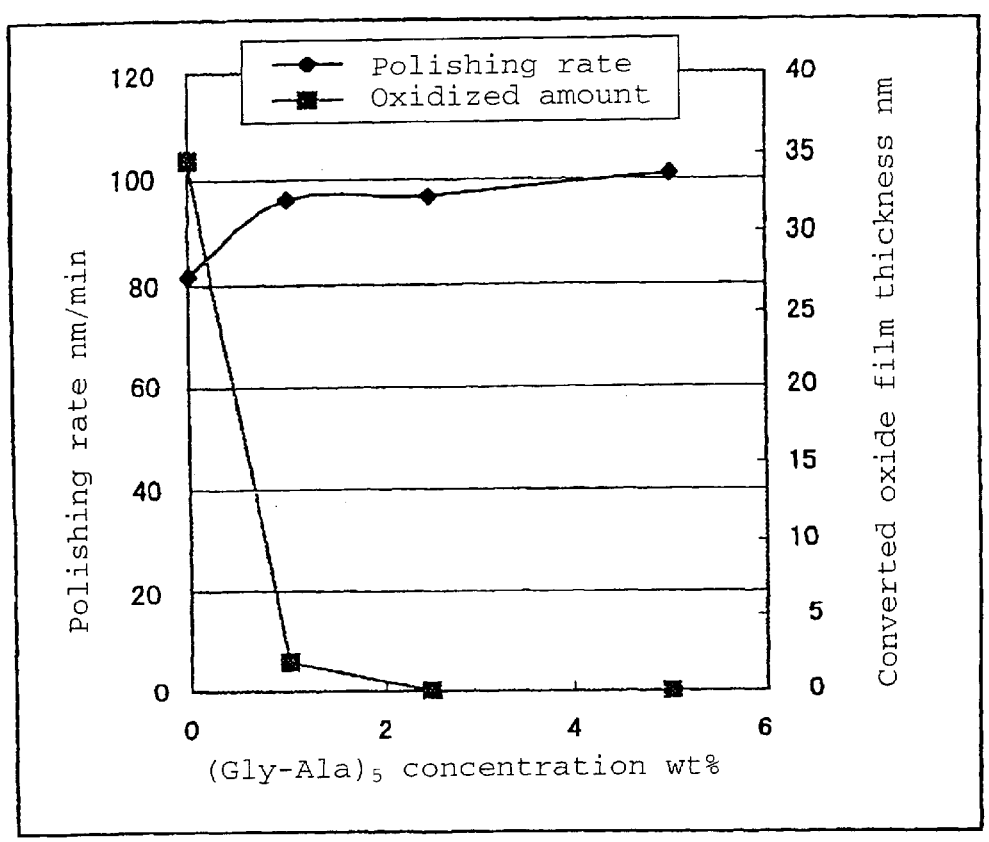
FIG. 5 is a graph of the polishing rate and the converted oxide thickness in the case of a polishing slurry of Example 5.
Figure 6:
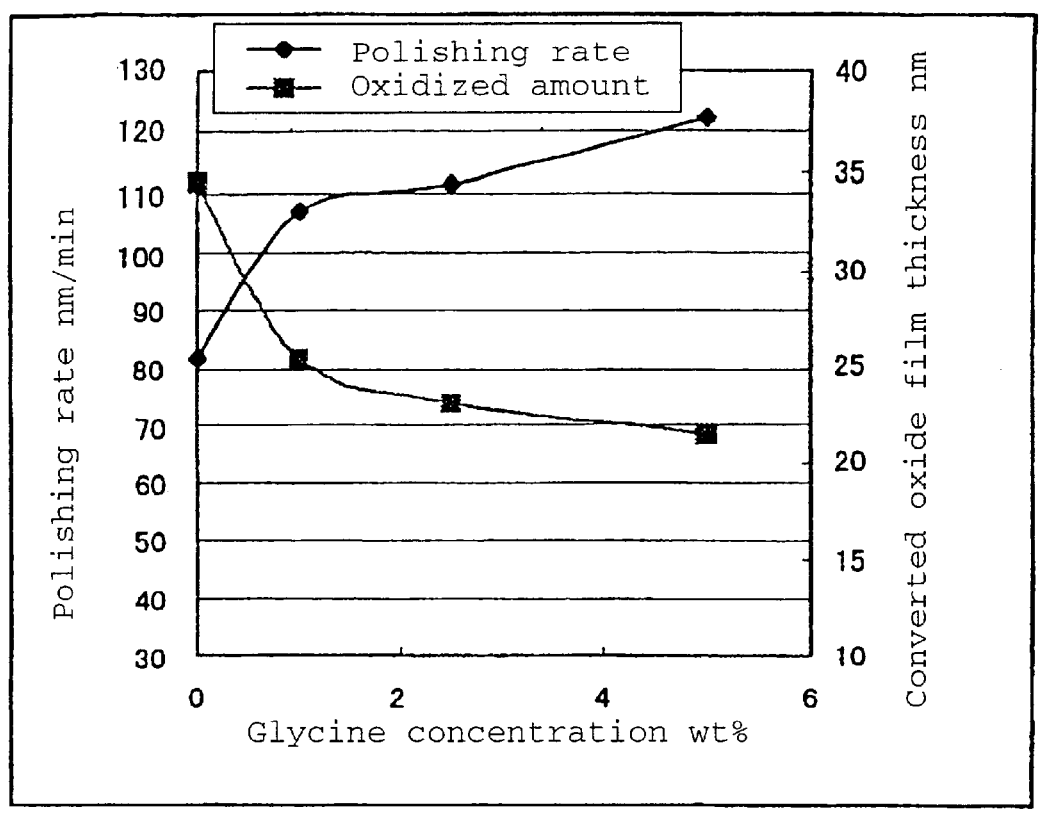
FIG. 6 is a graph of the polishing rate and the converted oxide thickness in the case of a polishing slurry of Example 6.

② Further, in Examples 4 to 6 (in cases wherein the polishing abrasive grains were alumina, hydrogen peroxide was added as an oxidizing agent, and the polishing compound slurries were adjusted to pH 13 with potassium hydroxide), as is evident from FIGS. 4 and 5 and Table 1, as the peptide concentration is increased from 1 to 5 wt %, the polishing rate increases from 80 to a level of 100 (nm/min), while the converted copper oxide thickness decreases from 35 to substantially 0 (nm), thus showing that film formation of copper oxide is prevented substantially completely. Further, as shown in FIG. 6, when glycine as an amino acid was added instead of the peptide, the same effect as the peptide was observed, but even when glycine was added in an amount of 5 wt %, the thickness of the copper oxide coating film merely decreased from 35 to 20 (nm), and it was impossible to completely prevent formation of a copper oxide coating film.

Figure 7:
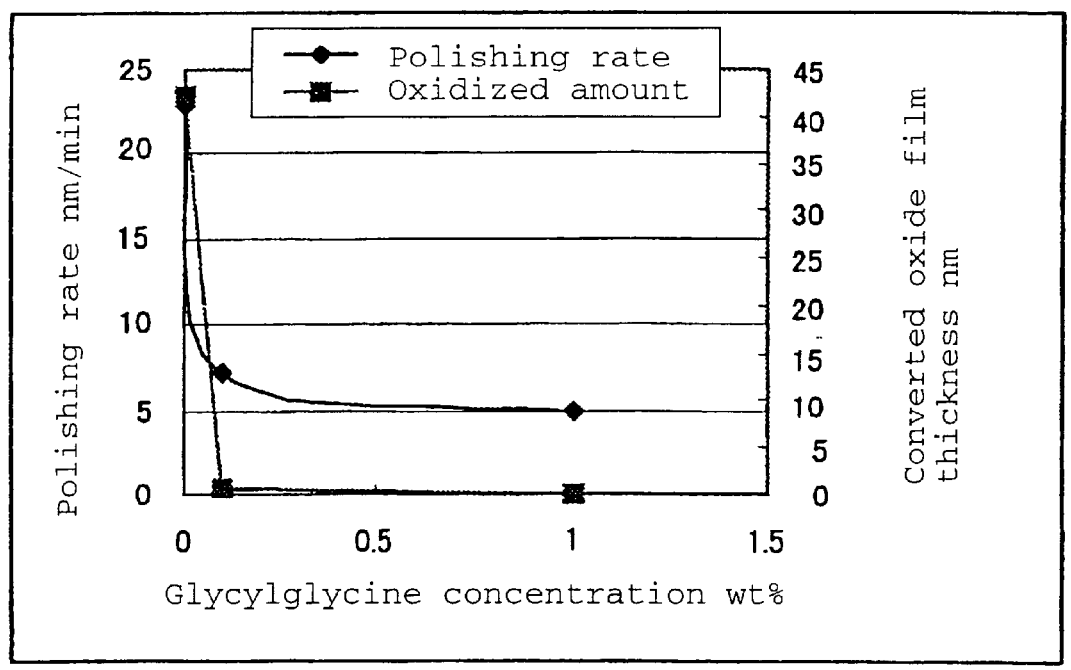
FIG. 7 is a graph of the polishing rate and the converted oxide thickness in the case of a polishing slurry of Example 7.

③ Further, in Example 7 (in a case where the polishing abrasive grains were cerium oxide, no hydrogen peroxide was used, and no adjustment of pH was carried out), as shown in FIG. 7 and Table 1, as the peptide concentration is increased from 1 to 5 wt %, the converted copper oxide thickness decreases from 43 to 0 (nm), but the polishing rate also decreases from 23 to 5 (nm/min), thus showing that even if the peptide concentration is changed, it is impossible to increase the polishing rate.

④ Further, with respect to a tantalum plate and a quartz glass plate, the polishing rates were measured under the same conditions as for the copper plate by the polishing compound abrasive grains as used in Examples 1 to 7, but in this case, it was found that even if the content of the peptide or the amino acid was changed, a substantially constant polishing rate was obtained.

⑤ Further, from Table 2, it was found that the polishing rate ratio can be changed by suitably selecting the weight ratio of the cerium oxide and alumina. This indicates that it is possible to select a polishing compound slurry having a polishing rate ratio which is more preferred for a pattern of the semiconductor substrate before polishing.

From the foregoing results, it is considered possible to obtain a polishing compound whereby the polishing rate of a metal layer of Cu or the like can freely be adjusted by adjusting the oxidizing agent such as hydrogen peroxide, the type of the pH controlling agent and the concentration of the peptide, or the ratio thereof. Further, it is evident that by properly selecting these conditions and the weight ratio of cerium oxide and alumina as polishing abrasive grains, the polishing rate ratios of the metal layer of Cu or the like, the barrier layer of tantalum or the like, and the insulating layer of $SiO_2$ or the like can be freely adjusted depending upon the particular purpose, without excessively oxidizing the metal layer.

It is thus considered that by using the polishing compound containing a peptide of the present invention, especially the polishing rate of metal can freely be controlled, such is suitably applicable to a planarization process in the production of semiconductor integrated circuits.

INDUSTRIAL APPLICABILITY

The polishing compound of the present invention can be effectively used as a polishing compound for metal CMP to polish a metal layer in the process for production of semiconductor devices, particularly to polish a Cu layer or the like and a barrier layer of tantalum or the like, which is the key technology for microsizing of semiconductor devices in future, and thus, its significance in the semiconductor device production industry is very high.

What is claimed is:

1. A polishing compound for polishing a metal layer and/or a barrier layer formed on a semiconductor substrate, which is a polishing compound for chemical mechanical polishing in a process for production of a semiconductor device and which comprises polishing abrasive grains and a peptide.

2. The polishing compound according to claim 1, which contains cerium oxide and/or alumina as the polishing abrasive grains.

3. The polishing compound according to claim 1, wherein the peptide contains from 2 to 30 amino acid units.

4. The polishing compound according to claim 3, wherein the peptide is at least one member selected from the group consisting of glycylglycine (Gly-Gly), alanylalanine (Ala-Ala), glycylalanine (Gly-Ala), alanylglycine (Ala-Gly), glycylglycylglycine (Gly-Gly-Gly) and di- to hepta-mers thereof.

5. A polishing compound slurry made of a slurry having the polishing compound as defined in claim 2 suspended in an aqueous medium in a solid content concentration of from 0.1 to 30 wt %.

6. The polishing compound slurry according to claim 5, wherein the content of the peptide in the polishing compound slurry is from 0.1 to 20 wt %.

7. The polishing compound slurry according to claim 6, which contains an oxidizing agent.

8. The polishing compound slurry according to claim 7, wherein the oxidizing agent is hydrogen peroxide.

9. The polishing compound slurry according to claim 5, having the pH adjusted to at least 7 by a pH controlling agent.

10. The polishing compound slurry according to claim 9, wherein the pH controlling agent is ammonia or a potassium compound.

11. The polishing compound slurry according to claim 5, wherein the metal layer is made of Cu or a Cu alloy.

12. A method for polishing a semiconductor substrate, wherein the polishing compound or the polishing compound slurry as defined in claim 1 is supported on an abrasive cloth of a chemical mechanical polishing apparatus, and the abrasive cloth is contacted with the metal layer and/or the barrier layer on the semiconductor substrate to polish at least a part thereof.

13. The polishing method according to claim 12, wherein the metal layer is made of Cu or a Cu alloy.

14. The polishing method according to claim 12, wherein the barrier layer is tantalum.

15. A method for polishing a semiconductor substrate, wherein the polishing compound or the polishing compound slurry as defined in claim 2 is supported on an abrasive cloth of a chemical mechanical polishing apparatus, and the abrasive cloth is contacted with the metal layer and/or the barrier layer on the semiconductor substrate to polish at least a part thereof.

16. The polishing method according to claim 15, wherein the metal layer is made of Cu or a Cu alloy.

17. The polishing method according to claim 15, wherein the barrier layer is tantalum.

18. The polishing method according to claim 13, wherein the barrier layer is tantalum.

19. The polishing method according to claim 16, wherein the barrier layer is tantalum.

20. The polishing compound according to claim 2, wherein the peptide contains from 2 to 30 amino acid units.

21. The polishing compound according to claim 20, wherein the peptide is at least one member selected from the group consisting of glycylglycine (Gly-Gly), alanylalanine (Ala-Ala), glycylalanine (Gly-Ala), alanylglycine (Ala-Gly), glycylglycylglycine (Gly-Gly-Gly) and di- to heptamers thereof.

* * * * *